C. P. HEWETT.
Yielding Teeth for Seeders and Cultivators.
No. 158,081. Patented Dec. 22, 1874.
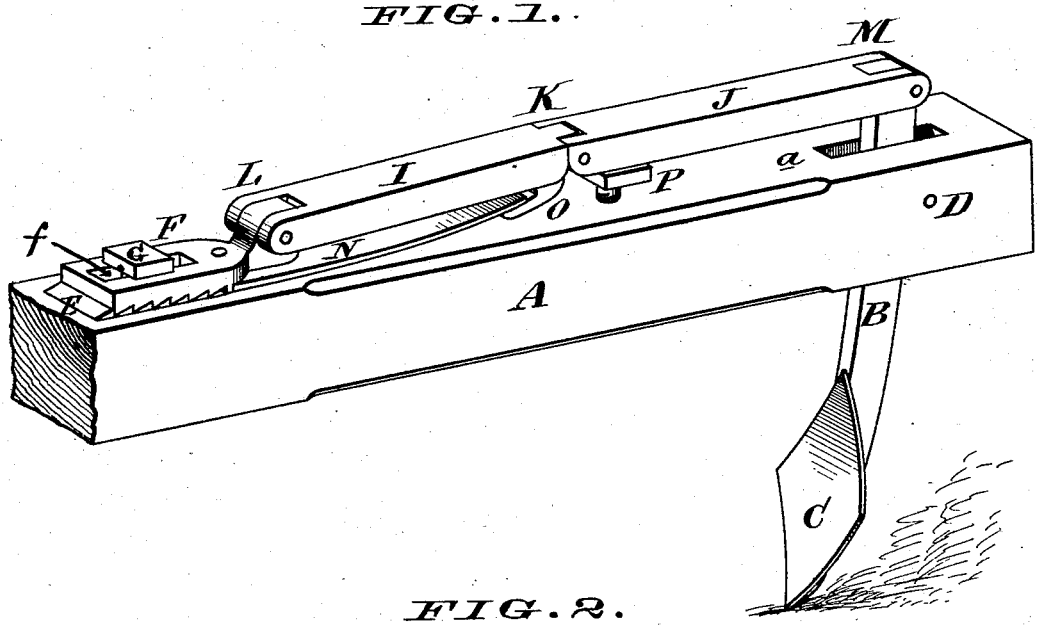
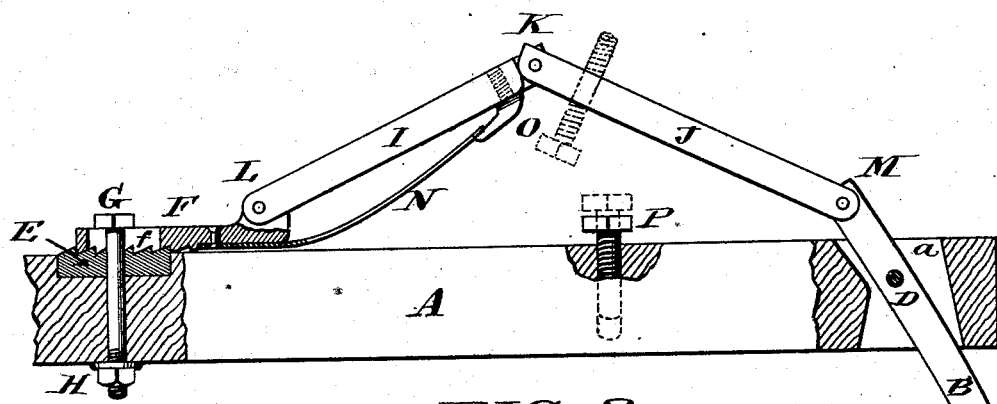
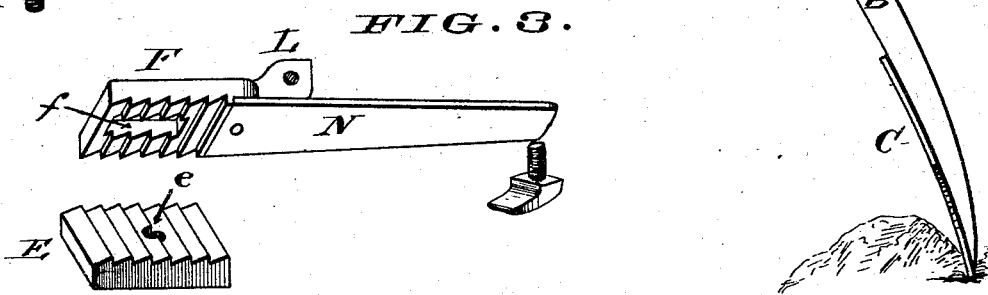

UNITED STATES PATENT OFFICE.

CORYDON P. HEWETT, OF KINGSTON, WISCONSIN, ASSIGNOR TO HIMSELF AND HENRY VOLKMANN, OF SAME PLACE.

IMPROVEMENT IN YIELDING TEETH FOR SEEDERS AND CULTIVATORS.

Specification forming part of Letters Patent No. 158,081, dated December 22, 1874; application filed August 7, 1874.

*To all whom it may concern:*

Be it known that I, CORYDON P. HEWETT, of Kingston, in the county of Green Lake and State of Wisconsin, have invented an Improvement in Yielding Teeth or Shares for Seeders and Cultivators, of which the following is a specification:

The invention is an improvement in devices whereby the teeth or shares of seeders and other like implements are capable of yielding when they come in contact with rocks or other immovable obstacles, so as to enable the implement to pass over the same, and then to forthwith resume its normal condition without injury or detention of any kind. The improvement is so arranged as to enable the setting of the teeth to any desired pitch or angle, and consists in providing corrugated or serrated plates at the front end of the hinged rod or toggle, and a spring-bar to hold the toggle in its normal position. The lower plate is attached to the front end of the beam and the upper plate to the hinged rod or toggle. The spring-bar is rigidly secured to the under side of the upper plate and extends forward, and has a bearing on a projection or screw-head depending from the hinged rod or toggle.

In the accompanying drawings, Figure 1 represents a portion of the beam of a seeder or like implement with the improvement applied, the parts being shown in their normal condition. Fig. 2 shows, by a partially-sectioned elevation, the same parts in the position they assume in passing over an impediment. Fig. 3 shows the corrugated plates and spring-bar detached.

A may represent a portion of the beam of a broadcast-seeder, or other like implement, the same being slotted at *a* to receive the shank or standard B of the share or tooth C, said shank or standard being connected to the beam by a pivot, D. To the head of this shank or standard B is pivoted the jointed rod or toggle I J, hinged at K L M. P is the adjustable screw-bolt, which is inserted, either in the beam or rod, and protected by a metallic plate at point of impact. E F are the corrugated or serrated plates. The lower plate E, is securely fastened to the front end of the beam, the toothed side being exposed. The upper plate, F, which rests by its toothed surface upon plate E, is held fast in any desired position by means of a screw-bolt, G, which, passing down through a slot, *f*, in plate F, and an orifice, *e*, in plate E, and thence through the beam, is made fast by a nut, H. A spring-bar, N, rigidly attached to the under side of the plate F, and whose free extremity is engaged over a projection or head, O, of a screw-bolt depending from the rod J, acts to hold the toggle to its depressed or normal position, as shown in Fig. 1, and to instantly restore it to that position on disengagement of the cultivator-tooth from the immovable obstacle over which it may be passing. The projection O can be adjusted so as to keep the spring and toggle at the same tension. The nearer the pivots come to alignment in the normal condition, the more firmly the tooth opposes displacement, and the greater force is requisite therefor.

The improved machine is adjusted and operated as follows: The bolt G having been temporarily slackened, the plate F is set forward or backward so as to give the tooth the desired pitch or obliquity with reference to the beam. The bolt G is then tightened so as to lock the corrugations firmly together, and to hold the spring N in firm condition for effective action. The bolt is then screwed up or down in order to secure the desired rigidity or sensitiveness, as the case may be, of the parts governing the position of the tooth. For example: Should it be desired that the tooth should yield only to a considerable obstruction, the bolt is adjusted only sufficient to throw the pivot K just above alignment with the pivots L and M, or should it be desired that the tooth should yield more readily, then the bolt is adjusted accordingly. Should it be desired to make the tooth rigid, this can be easily effected by simply screwing in the adjustable bolt and slackening bolt G so as to allow the spring N to draw the knee K below the joints L and M. The screw G then being tightened, the toggle will become stiff and incapable of yielding, and the tooth will, of course, be rigid, or, in other words, so as not to allow the lock to be sprung.

It will thus be seen that this form of sliptooth may be made self-releasing at any desired resistance, or be converted into a dead-lock at will, and that it may, by the same means, be given any desired pitch or angle.

I have described the invention in its applicability to a seeder or grain-drill, but it is manifestly applicable to subsoil and shovel plows and other cultivators. I have described my adjustable and self-releasing lock as applied to the upper end and in front of the share-standard, but reserve the right to apply such a lock in the form of a brace below the beam and in rear of the standard, and such a brace may also serve as a means of setting and holding the tooth to any desired pitch or rake substantially as where arranged in front of the standard, as in the above illustration.

I claim as my invention—

1. The combination, with the pivoted share or tooth B C D, and hinged rod or toggle I J K L M, of the corrugated or serrated plates E and F, bolts G and P, and the spring N, adapted to bear on a projection, O, from rod J, substantially as set forth.

2. The combination, with the pivoted share or tooth B C D, toggle I J K L M, and plates E F, of the spring N, having its free end bearing on an adjustable projection, O, for regulating the tension of the spring, substantially as specified.

CORYDON P. HEWETT.

Attest:
GEO. H. KNIGHT,
J. P. WOODWARD.